C. C. Foster.
Fertilizer.
No. 3,587. Reissued Aug 3, 1869.
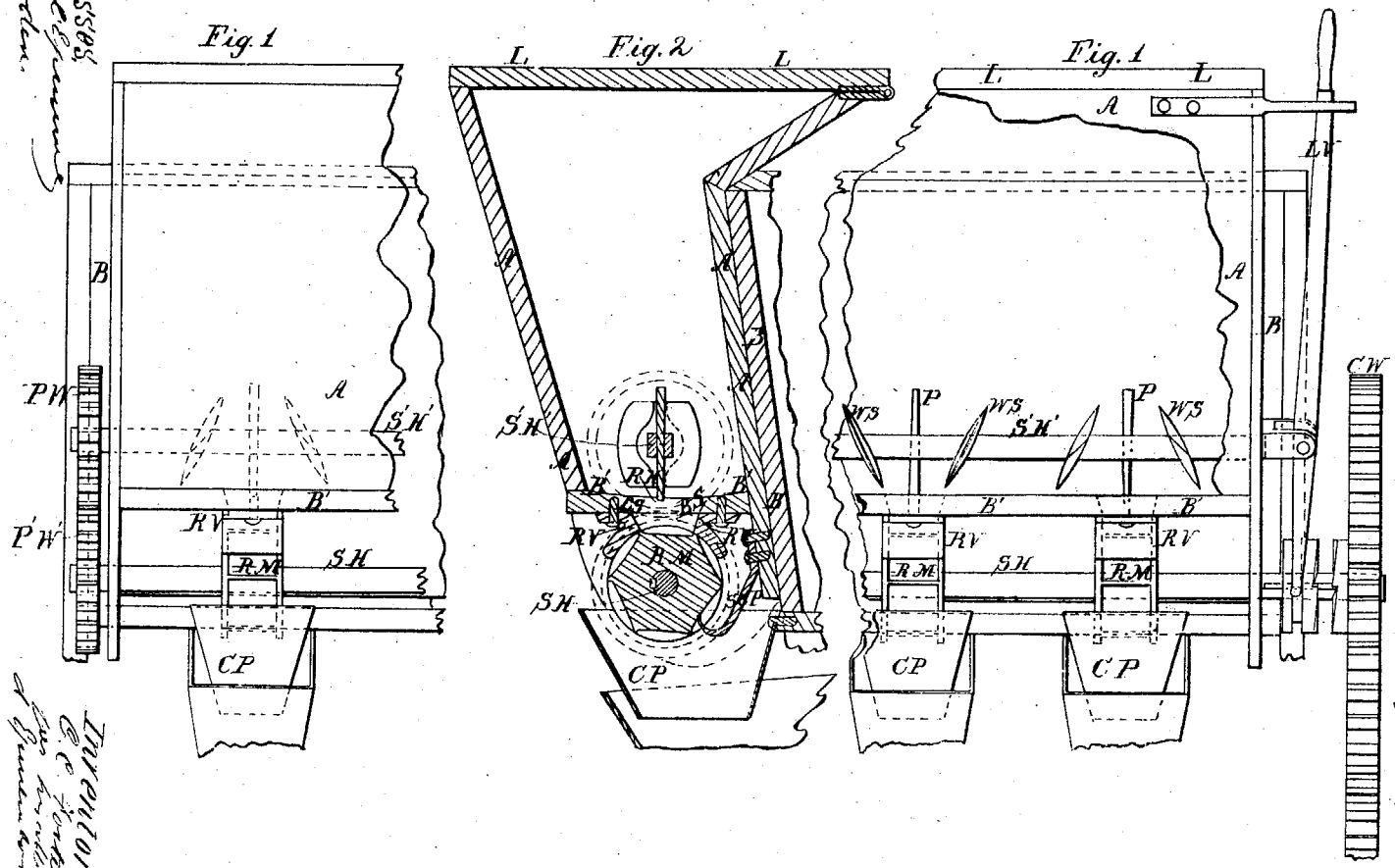
Witnesses.
Louis C. Spenner
H. C. Browden.
Inventor:
C. C. Foster
per Knowlton & Spenner Att'ys

UNITED STATES PATENT OFFICE.

C. C. FOSTER, OF ODESSA, DELAWARE.

IMPROVEMENT IN FERTILIZER ATTACHMENTS.

Specification forming part of Letters Patent No. 77,269, dated April 28, 1868; Reissue No. 3,587, dated August 3, 1869.

*To all whom it may concern:*

Be it known that I, C. C. FOSTER, of Odessa, in the county of New Castle, in the State of Delaware, have invented a new and useful Improvement in Fertilizer Attachments; and I do hereby declare that the following is a full and exact description thereof, reference being had to the accompanying drawings, making a part of this specification, in which—

Figure 1 shows an elevation view of my attachment; Fig. 2, a transverse section of the same.

The nature of my invention consists in providing wheat-drills and other like machines with a box or attachment of simple construction, and by means of which any fertilizing substance—such as phosphate of lime, &c.—can be sown without the help of the hand.

To enable others skilled in the art to make and use my invention, I will now proceed to describe its construction and operation.

A A is the frame-work or box of my phosphate attachment. It is a light wooden or metallic box, made somewhat in the shape of a hopper, with a lid, L L.

B is the back of the hopper of any drill to which I may attach my attachment A A, being secured there by means of screws or otherwise.

A series of rectangular holes, R H, with beveled sides B S, is cut through the bottom B′ of A A. This bottom may be either stationary, forming part of the box, or may be adjustable, so as to be moved up and down by any suitable means. Under B′, and to correspond with each of the holes R H, are saddles R V. A rectangular hole corresponding in size and shape to hole R H is cut through each of said saddles.

The bottom B′ and saddles R V may be cast in one piece, if so desired, or otherwise, so that when formed with the bottom constitute an entirety.

A shaft, S H, is set lengthwise under and parallel to bottom B′, and on said shaft is set a series of rollers, R M, made of metal or any suitable material. Their diameters will determine the position of shaft S H, which must be so placed as to bring the top of each roller to fit easy into each corresponding reversed bearing. The rollers, all equal in size, must be made so that in their periphery a number of recesses are cut, so as to leave between each two recesses a cutting or sharp edge.

Inside of box A A, and near and parallel to its bottom, is placed a shaft, S′ H′, on which is set a series of pins, P, each one corresponding with one of the holes in bottom B′, the length of said pins P being so calculated that when S′ H′ revolves the pins will not touch bottom B′. On both sides of each pin P, and on S′ H′, are set propeller-shaped wings W S, placed symmetrical, two by two. One end of S′ H′ revolves in a journal set in that end of A A. The other end of S′ H′ runs clear through the other end of A A, and a pinion is keyed onto outside end of S′ H′. Said pinion P W gears with another pinion, P′ W′, of same diameter, keyed on outside end of S H, the other end of said shaft bearing a cog-wheel, C W, which is to gear with a pinion on the inside face of the wheel of the drill my attachment is applied to. C W slides freely on end of S H, so as to be easily put in or out of gear by means of lever L V. Between the back side of A A and each roller is set a scraping-spring, S C P, for the purpose hereinafter described. Lastly, under each roller is placed a metallic or wooden cup, C P.

My attachment being attached to any drill and being filled with the necessary phosphate, or any other manure preferred, if the drill is driven ahead cog-wheel C W, driven by pinion on the drill's wheel, will drive S′ H′, which, by means of pinions P′ W′, will drive shaft S H. The phosphate in box A A being thus stirred and moved and divided, or by as many hands, by means of wings W S, will fall through holes B S and R H. There, in consequence of the rotary movement of roller R M, the sharp edges on periphery of which form, with the sharp edges of hole on saddles R V, as many cutters, which will all the time mince or separate the phosphate very fine and drive it down through cups C P, and thence, with the grain, to the ground, the object of the scraper-spring S C P being to keep the recesses or rollers constantly clean and prevent the phosphate, if wet, to clog there and fill said recesses up.

By making the bottom B′ adjustable, so as to move it closer to or farther from the rollers, I am enabled to regulate the amount of phosphate to be sown and to prevent the wet or damp phosphate from choking.

Having thus fully described my invention, what I claim as new, and desire to secure by Letters Patent, is—

1. The arrangement, upon a suitable shaft under the bottom of the hopper of a fertilizer attachment, of one or a series of polygonal-shaped rollers of any suitable material, said rollers being provided with small recesses and projecting edges on their peripheries, substantially as shown and described.

2. The arrangement, upon a cross-shaft in the hopper a suitable distance above the movable or stationary bottom, of the wings W S and pins P P, or their equivalents, substantially as and for the purposes set forth.

3. In combination with the polygonal-shaped rollers R M, the springs S C P, substantially as and for the purposes specified.

4. The saddles R V, whether cast with or connected to the hopper-bottom by screws or otherwise, said bottom being provided with beveled openings, as described, in combination with the polygonal-shaped wheels R M, substantially as set forth.

5. In combination with the saddles R V, the beveled openings R H in the hopper-bottom, over which pass the vertical pins P on the shaft S′ H′, substantially as set forth.

In testimony that I claim the foregoing I have hereunto set my hand.

CALEB C. FOSTER.

Witnesses:

PENTON BELVILLE,

R. A. V. WOOD.